April 23, 1935. A. LINT 1,998,680
HEADLIGHT MOUNTING
Filed July 17, 1933 2 Sheets-Sheet 1
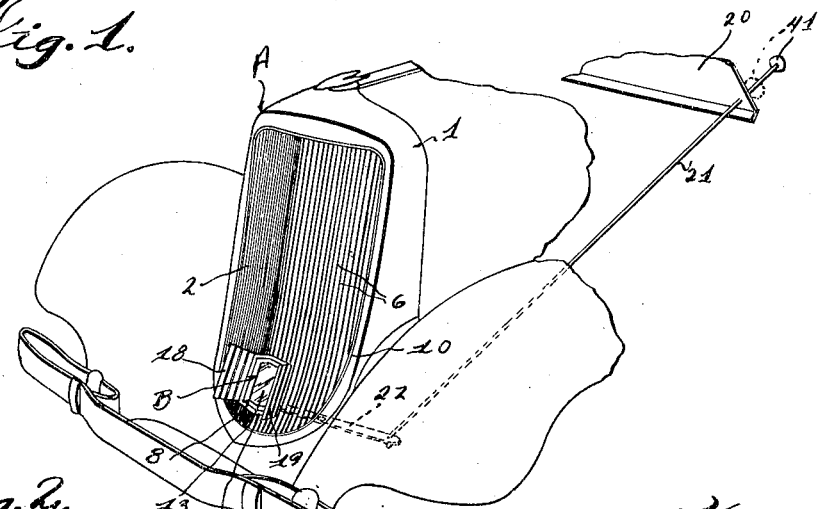
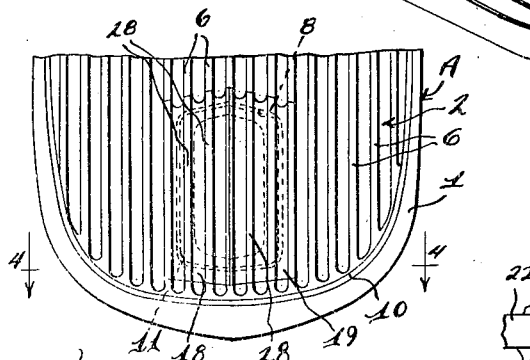
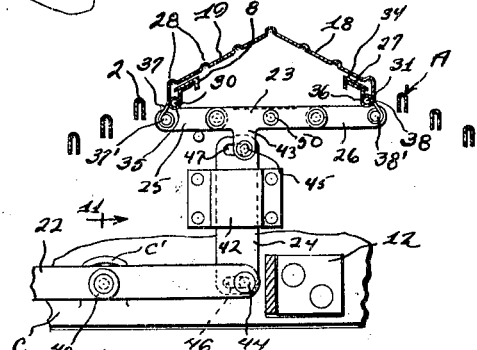
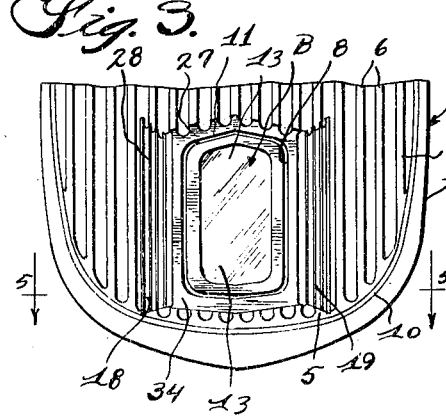
Inventor
Amos Lint April 23, 1935. A. LINT 1,998,680
HEADLIGHT MOUNTING
Filed July 17, 1933 2 Sheets-Sheet 2
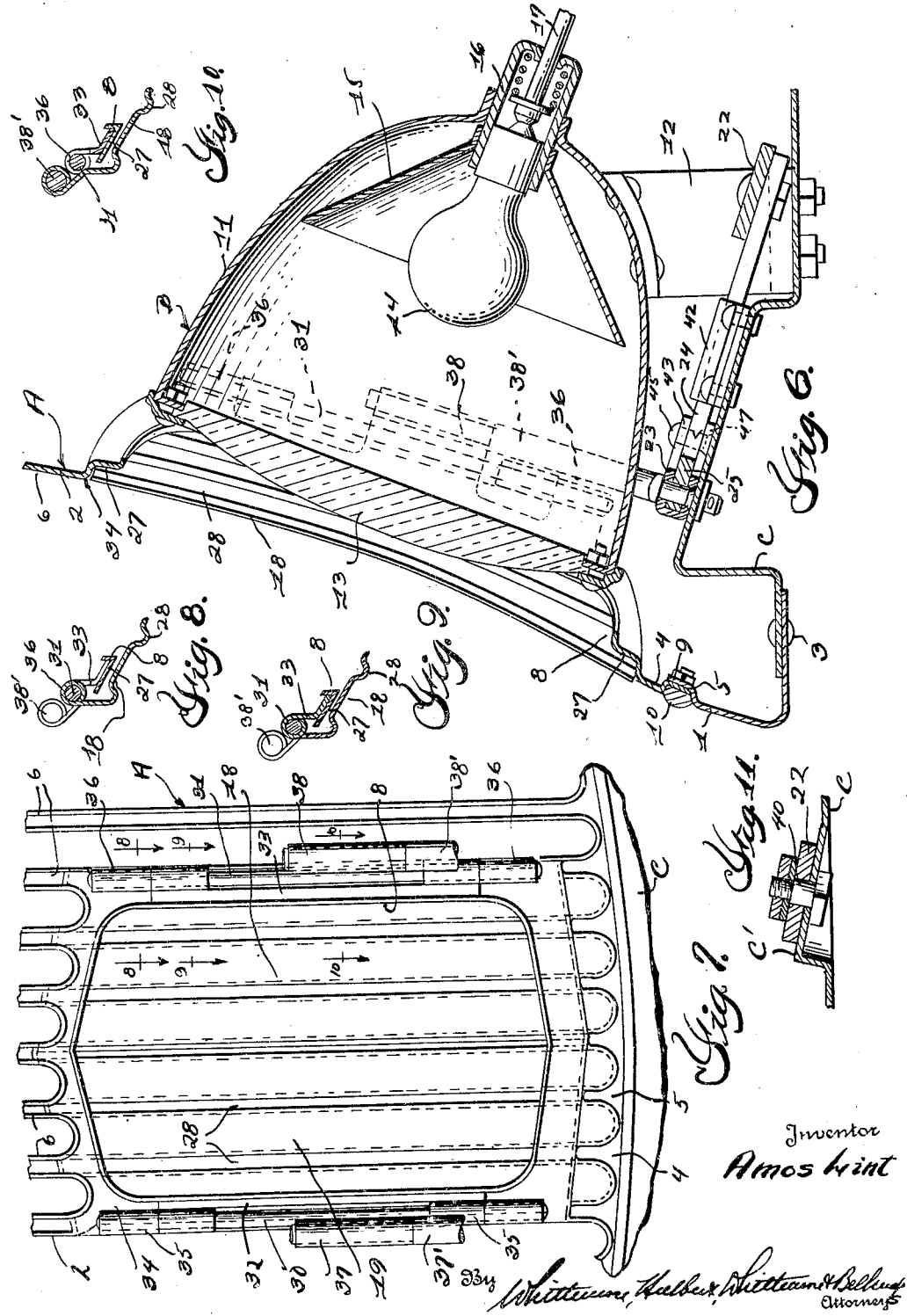

Patented Apr. 23, 1935

1,998,680

UNITED STATES PATENT OFFICE 1,998,680

HEADLIGHT MOUNTING

Amos Lint, Toledo, Ohio, assignor to The City Auto Stamping Company, Toledo, Ohio, a corporation of Ohio Application July 17, 1933, Serial No. 680,829

10 Claims. (Cl. 240—7.1)

This invention relates generally to headlight mountings and refers more particularly to those designed for automobiles.

One of the essential objects of the invention is to provide a mounting of this type wherein the headlight is normally concealed but may be readily exposed for use.

Another object is to provide a mounting wherein the headlight concealing means is preferably a part of the auxiliary front for the radiator of the automobile and includes a pair of doors or shutters which may be opened and closed from a remote point such as from the instrument board of the automobile.

Other objects, advantages and novel details of construction of this invention will be made more apparent as this description proceeds, especially when considered in connection with the accompanying drawings, wherein:

Figure 1 is a fragmentary perspective view of an automobile having a headlight mounting embodying my invention and showing the doors in open position;

Figure 2 is a fragmentary front elevation of the lower part of the radiator shield and showing the doors in closed position;

Figure 3 is a view similar to Figure 2 but showing the doors in open position;

Figure 4 is a sectional view taken on the line 4—4 of Figure 2;

Figure 5 is a sectional view taken on the line 5—5 of Figure 3;

Figure 6 is an enlarged vertical sectional view through the headlight mounting embodying my invention;

Figure 7 is a fragmentary rear elevation of the shield and showing the hinged mounting for the doors;

Figure 8 is a sectional view on the line 8—8 of Figure 7;

Figure 9 is a sectional view on the line 9—9 of Figure 7;

Figure 10 is a sectional view on the line 10—10 of Figure 7.

Figure 11 is a sectional view taken on line 11—11 of Figure 4.

Referring now to the drawings, A is a radiator shield or guard; B is a headlight in rear of said shield, and C is a splash apron of the automobile constituting a common support for said shield and headlight.

As shown, the shield A comprises a shell 1 for receiving the usual radiator unit or core (not shown), and a grille 2 forming an auxiliary front for such unit or core. The shell is preferably fastened by rivets 3 to the splash apron C and has an opening 4 in its front face, while the grille 2 covers the opening 4 in the shell and preferably comprises a metal stamping having a marginal portion 5, a series of laterally spaced vertically extending bars 6 of U cross section, and a vertically extending substantially rectangular window 8. Preferably the marginal portion 5 of the grille is secured within an inwardly offset portion 9 of the shell and the joint between the parts is concealed by a suitable molding 10.

The headlight B is conventional in design and is located directly in rear and in substantially horizontal alignment with the window 8 in the grille of the radiator shield. Preferably the housing 11 of the light is carried by a bracket 12 on the splash apron and contains the usual lens 13, electric light bulb 14 and reflector 15. The socket 16 for the bulb preferably extends through the back of the housing and receives the usual electrical conductor 17.

For concealing the light B I have provided two doors or shutters 18 and 19, respectively, that are hingedly mounted at opposite sides of the window 8 and are adapted to be opened and closed from a point in rear of the instrument board or panel 20 of the automobile by a rod 21 and suitable levers 22 and 23 and links 24, 25 and 26, respectively. Preferably the doors 18 and 19 are received within an inwardly offset portion 27 of the window frame and have vertically extending ribs 28 in line with and forming continuations of the bars 6 of the grille. The hinge pintles 30 and 31 for the doors are carried by hinge strips 32 and 33 fixed to the rear face of the window frame 34. The doors 18 and 19 have tubular portions 35 and 36, respectively, receiving these pintles and are provided with rearward extensions 37 and 38, respectively, that are pivotally mounted on pins 37' and 38' carried by the links 25 and 26. The lever 22 is pivoted intermediate its ends upon a pin 40 carried by an embossed portion C' the splash apron C and is terminally connected to the rod 21 and link 24. As shown, this rod 21 extends through the instrument board 20 and is provided with a knob or handle 41, while the link 24 is slidable in a bracket 42 on the apron C and is connected to a rearward projection 43 of the lever 23. Preferably the connections between the link 24 and levers 22 and 23 include pins 44 and 45, respectively, which engage transversely extending slots 46 and 47, respectively, in the link 24 to compensate for the swinging movements of the levers. The lever 23 is pivoted intermediate its ends on a pin 50 carried by the apron C and is terminally connected to the links 25 and 26.

Thus in use the rod 21 may be pushed to open the doors 18 and 19 and may be pulled to close the same. When open the doors 18 and 19 will expose the lens 13 so that the lamp B may function as a headlight. During the day when the light is not needed or used, the doors 18 and 19 may be closed so that the lamp will be concealed. When closed the doors form part of the auxiliary front for the radiator and cooperate with the grille 2 to provide a neat and attractive appearance.

What I claim as my invention is:

1. In combination, a radiator shield having a grille provided with a window, a headlight in rear of and operable to project light rays through the window, and closure means for the window carried by and simulating the grille in appearance.

2. In combination, a radiator shield having a shell and a grille within the shell, the grille having a window therein, a headlight in rear of and operable to project light rays through the window, and a closure for the window conforming in appearance to the grille.

3. In an automobile, a splash apron, a radiator shield carried by the apron and having a grille provided adjacent the apron with a window, and a headlight supported on the splash apron so as to project light rays through the window.

4. In an automobile, a splash apron, a radiator shield carried by the apron and having a grille provided adjacent the apron with a window, a headlight supported on the splash apron so as to project light rays through the window, a closure for the window, and actuating means for the closure including means also carried by the splash apron.

5. In combination, a radiator shield having a grille comprising spaced bars, certain of said bars being cut away to provide a window, a headlight arranged in rear of the grille to project light rays through the window, and a closure for the window having spaced ribs in alignment with and forming continuations of the bars aforesaid.

6. In combination, a radiator shield having a grille comprising spaced bars, certain of said bars being cut away to provide a window through which light rays from a headlight in rear of the grille may be projected, and a closure for the window having spaced ribs in alignment with and forming continuations of the bars aforesaid.

7. In combination, a radiator shield having a grille provided with a window, a headlight in rear of said grille and operable to project light rays through said window, and closure means for said window conforming in appearance to and forming a continuation of portions of said grille.

8. In combination, a radiator shield having a grille provided with a window, a headlight in rear of and operable to project light rays through said window, and closure means for the window simulating the grille in appearance, the construction and arrangement of the headlight, window and closure means being such that the headlight is concealed by the closure means when said means is in closed position and the light rays from said headlight extend between portions of said closure means when the latter is in open position.

9. In combination, a radiator shield having a grille provided with a window, a headlight in rear of and operable to project light rays through the window, and closure means for the window forming a part of and simulating the grille in appearance, the area of the window being substantially equal to the front face of the headlight, whereby the latter is concealed when the closure means is in closed position.

10. In combination, a radiator shield having a grille provided with a window, a headlight in rear of and operable to project light rays through said window, and closure means for the window comprising cooperating doors hingedly connected to and simulating the grill in appearance.

AMOS LINT.